May 29, 1973  ISAGO MIURA  3,736,203

METHOD OF FORMING ANNULAR SHAPED WRAPPING

Filed Feb. 8, 1971  3 Sheets-Sheet 1

INVENTOR.
ISAGO MIURA

BY
Kane, Dalsimer, Kane, Sullivan + Kurucz
ATTORNEYS

May 29, 1973  ISAGO MIURA  3,736,203
METHOD OF FORMING ANNULAR SHAPED WRAPPING
Filed Feb. 8, 1971  3 Sheets-Sheet 2
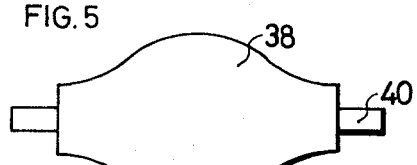
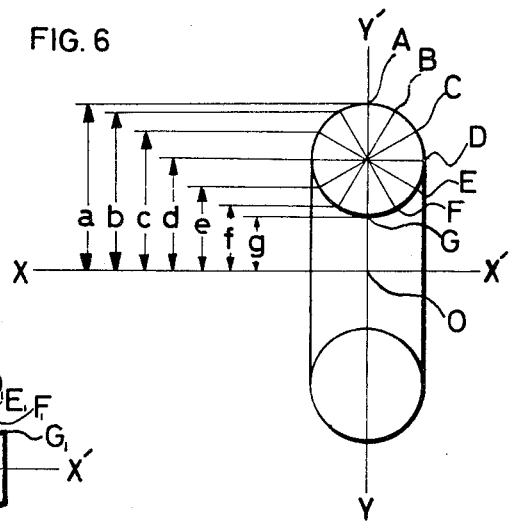
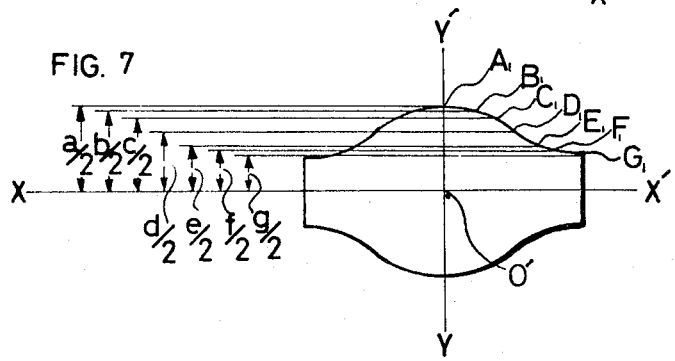
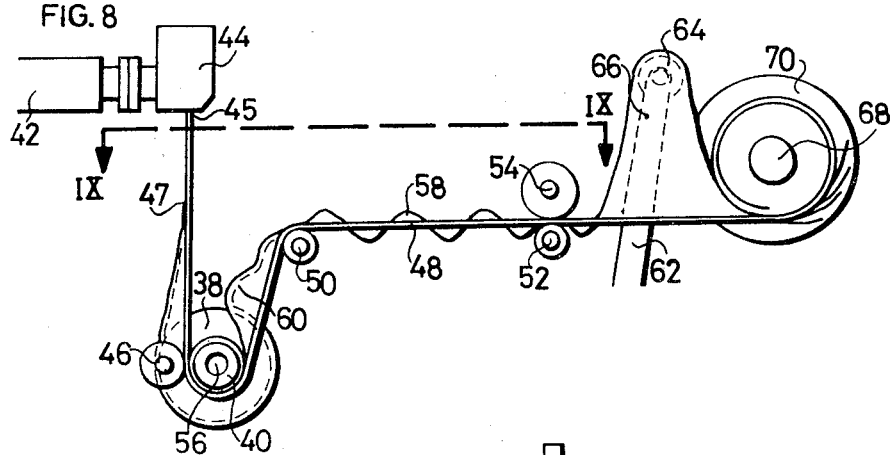
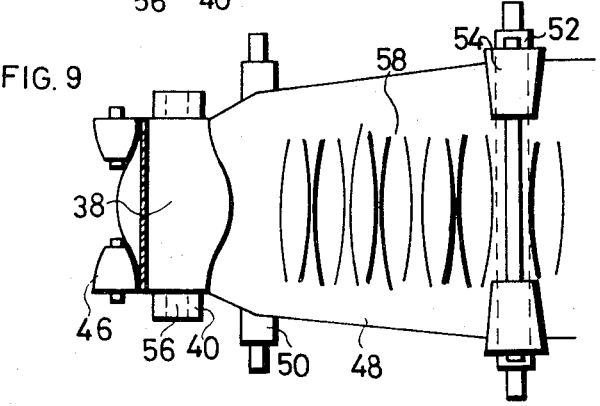
INVENTOR.
ISAGO MIURA
BY
ATTORNEYS

United States Patent Office 3,736,203
Patented May 29, 1973

---

3,736,203
METHOD OF FORMING ANNULAR SHAPED WRAPPING
Isago Miura, 1-4-19 Honcho, Asaka, Japan
Filed Feb. 8, 1971, Ser. No. 113,376
Int. Cl. B65h 81/00
U.S. Cl. 156—189    7 Claims

ABSTRACT OF THE DISCLOSURE

A method and an apparatus is provided for forming packing or wrapping material of an elastic plastic sheet material for products of special shapes and particularly annular articles. The sheet of material is permanently stretched in a longitudinal direction with the amount of stretching varying across the width of the sheet so that the sheet assumes a permanent shape to insure wrapping of an annular article without any air gaps between the wrapping material and the article.

BACKGROUND OF THE INVENTION

Field of the invention

This invention relates to a method and an apparatus for forming a packing or wrapping material for goods and particularly a method and an apparatus for forming a wrapping material for an annular article.

Description of the prior art

Hitherto, wrapping of electric wires and tubular goods such as rings, automobile tires or the like was usually achieved by sequentially winding either a paper tape, vinyl tape or the like about the goods in a coiled partially overlapped fashion. The wrapping operation employing such tape was generally accomplished by hand requiring a considerable amount of time and, at the same time, imposed an unsightly or poor wrapper appearance in many cases. In addition, with this method, inspection of the goods is almost impossible following wrapping. Furthermore, liquid- or air-tight packing of goods was almost impossible with this wrapping technique. Finally, attempts at mechanical or automatic wrapping of conventional tape have not met with any degree of success.

SUMMARY OF THE INVENTION

The present invention is directed to a method and an apparatus of forming wrapping or packing material for ring-shaped goods and ring-shaped tubes.

The primary object of this invention is to provide a method and an apparatus of producing wrapping material with which ring-shaped goods can be wrapped easily and positively.

Another object of this invention is to provide a method and an apparatus of forming wrapping material which enable liquid- or air-tight wrapping of ring-shaped goods.

Other objects, features and advantages of this invention will become apparent from the following description taken in conjunction with the accompanying drawings.

BRIEF DESCRIPTION OF THE DRAWINGS

FIG. 5 is the front view of the roller;
FIGS. 6 and 7 are schematic diagrams illustrating the method of determining the configuration of the roller;
FIG. 8 is the side view illustrating the apparatus to make film tape into the configuration of the roller;
FIG. 9 is the plane view take along the line IX—IX in FIG. 8.

DESCRIPTION OF THE PREFERRED EMBODIMENTS

Figure 1:
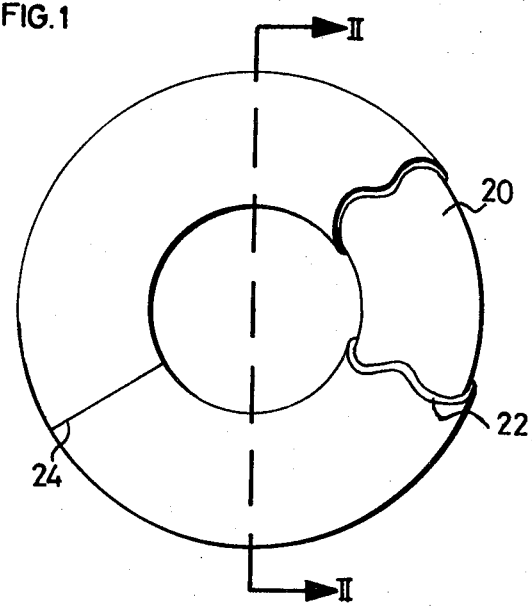
FIG. 1 is the front view of the sample mold and the film coating.

In FIG. 1, reference numeral 20 indicates an exemplary ring-shaped mold to which a coating is applied and which is peeled off. The mold 20 may be made of iron, for example. The mold 20 is the same in configuration and size as the goods to be wrapped. Reference numeral 22 indicates the film coating wrapped about the mold 20, which coating is formed of a material such as, for example, vinyl chloride, acrylonitrile-butadiene-styrene, polyethylene, vinyl polymers and copolymers which ordinarily possess plasticity and a certain degree of elasticity. Reference numeral 24 indicates a dividing or rip line of the coating 22 formed by cutting in the radial direction of the mold 20. Reference numeral 26 indicates a dividing or rip line of the coating 22 formed by cutting in the circular direction of the mold 20.

Figure 3:
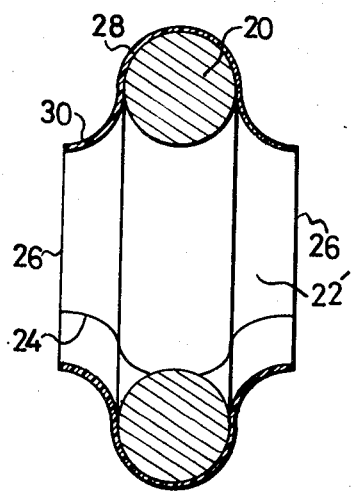
FIG. 3 is the cross-sectional view taken along the line II—II in FIG. 1 when the coating is partly peeled off.

The coating 22 is partly peeled off from the mold 20 at the dividing line and assumes the form of the partly peeled coating 22′ and the shape shown in FIG. 3. Reference numeral 28 indicates the part of the coating 22 that still contacts the mold 20 closely, and 30 designates the part that is detached from the mold 20. Thus, the shaped film which is the same in configuration as the partly peeled coating 22′, may advantageously be employed to wrap ring-shaped goods easily and positively by sealing the dividing or rip lines 24 and 26 with an adhesive binder material, an adhesive tape or by heat sealing.

Theoretically, it may be possible to form the film into the shape of the coating 22′ by the roll method in which the plane film tape is heated and pressed to the roll which is the same in configuration as the inner surface of the partly peeled-off coating 22′. In such instance, however, and as a practical matter, it is almost impossible to make a plane film tape into such configuration because the slope or gradient of the roll surface is so steep that the film will become wrinkled or creased while forming into that shape.

Figure 4:
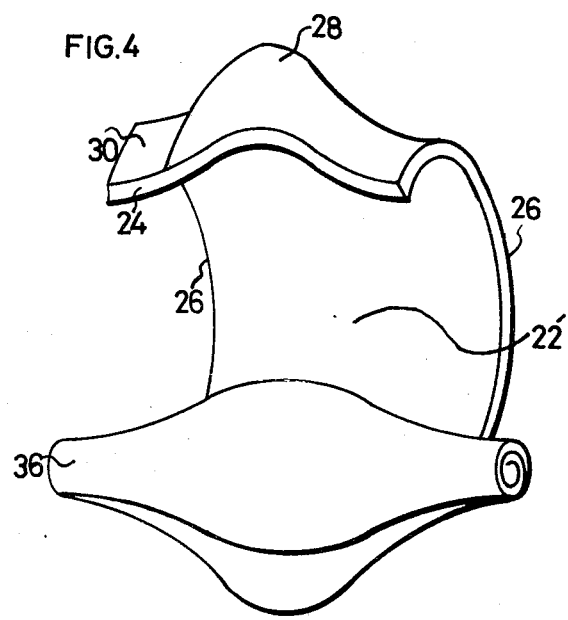
FIG. 4 is the perspective view of the coating peeled off from the mold and rolled up partly.

In this invention, partly peeled-off coating 22′ is peeled off from the mold 20 and is slightly spread out and is then rolled up in the direction of the rip line 26 in such a manner that, for example, its inner surface is on the outside such as indicated by an arrow in FIG. 4, thus producing a rolled tape sheet 36, as depicted in FIG. 4, without any substantial wrinkling or creasing. The radius of the rolled tape sheet 36 must be smaller than that of the original mold 20. If the radius of the rolled tape sheet 36 is larger than that of the mold 20, the rolled tape sheet 36 will become creased.

Then the configuration of the rolled tape sheet 36 is applied to the metallic roller 38 which turns along the axis 40. With apparatus which will be described later, thermal plastic film will be wound about the roller 38 and formed into the configuration of the roller 38 which is the same configuration as the rolled tape sheet 36. It is far easier to form the plane plastic film tape to the configuration of the roller 38 than into the configuration of partly peeled-off coating 22' in FIGS. 3 and 4.

The film thus formed is spread out on the selected ring-shaped or annular product to be wrapped and in this case the film is restored to its original shape due to its elasticity, so that it partly covers the annular product in the same manner that the partly peeled-off coating 22' covers the mold 20 as depicted in FIG. 3. The film is turned inwardly with little force so that the film covers the annular product in the same manner that the coating 22 covers the mold 20 in FIGS. 1 and 2.

Thus, with a film formed on the roller 38 as described above, the ring-shaped product can readily be covered by simply spreading the film on the outside of the ring-shaped product and turning the apart part of the film to inside with little force. Accordingly, the wrapping can be achieved neatly with relative ease in a very short time. Further, if the rip lines 24 and 26 are sealed with a suitable adhesive binder or adhesive tape after wrapping the product, the product may thusly be easily wrapped in an air- or liquid-tight manner.

Figure 2:
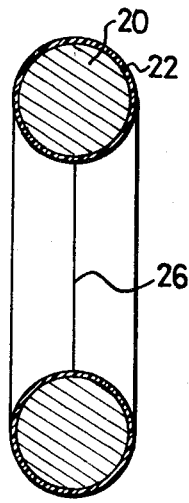
FIG. 2 is the cross-sectional view taken along the line II—II of FIG. 1.

Reference is now made to FIGS. 6 and 7 wherein a method is disclosed for determining the configuration of roller 38. It will be recalled numeral 20 is the mold of the annular product as shown in FIG. 2. In FIG. 6, the circumference of circular cross-section of the tubular coating 22 (see FIG. 2) is divided into, for example, twelve equal parts; and the divided points on the semi-circle are indicated by A, B, C, D, E, F and G. In this case, an extension of a straight line which passes through the center of the circular cross-section and the center O' of the ring-shaped is denoted as Y'Y; and a line passing through the center O' of the tubular coating and perpendicular to the straight Y'Y and a plane including the ring-shaped coating 22 is denoted as X'X. In FIG. 6 the distances from the points A, B, C, D, E, F and G to the straight line X'X are denoted, respectively, as $a$, $b$, $c$, $d$, $e$, $f$ and $g$.

As shown in FIG. 7, a point $A_1$ is taken at a distance $½a$, for example, upwards from the intersecting point O'' of two straight lines X'X and Y'Y crossing at right angles to each other which correspond to the lines X'X and Y'Y in FIG. 6. A straight line is drawn in parallel with the line X'X and passing through a point in the line Y'Y at a distance $½b$ from the point O'' on the side of Y', and intersecting points of the straight line with a circle about the point A which has a radius of an arc AB shown in FIG. 6 are designated by $B_1$. Similarly, circles having a radius of an arc BC are described about the points $B_1$, which intersect with a straight line passing through a point in the line Y'Y at a distance $½c$ from the point O'' on the side of Y' and running in parallel with the line X'X, and the outer intersecting points relative to the line Y'Y are identified by $C_1$. In a similar manner, circles having radii of arcs CD, DE, EF and FG are drawn which intersect with straight lines passing through points in the line X'X at distances $½d$, $½e$, $½f$ and $½g$ from the point O on the side Y' and running in parallel with the line X'X; and the outer intersecting points are designated by $D_1$ to $G_1$; and curves joining the points are indicated by $G_1$, $F_1$, $E_1$, $D_1$, $C_1$, $B_1$, $A_1$, $B_1$, $C_1$, $D_1$, $E_1$, $F_1$, $G_1$. These curves are turned about the straight line X'X to obtain a roller 38.

In the example mentioned above, the scale factor ½ is used to design the roller. However, the scale factor is not restricted to ½, and it is theoretically possible to take any scale factor. For example, to take the scale factor of 1, the configuration of the roller becomes the same as the coating 22' in FIG. 3. It is not, however, preferable in practice and it is suggested that the scale factor of 1 not be used as is the case of a scale factor greater than 1. On the other hand, it has been found that it is not necessary to employ too small a scale factor as the precision may not be required.

Reference is now made to FIGS. 8 and 9 wherein the method and the apparatus of making the film tape into desired configuration is shown employing the above mentioned metallic roller 38. Raw material is extruded out from the extruder 42 through the opening 45 between the lips of the flat die 44. The thickness of the raw material squeezed out is controlled by the size of the opening 45. The raw material squeezed out through the opening 45 is in the configuration of flat thin film tape 47. The raw material at the opening 45 is at about 200° C. and in liquid condition with no tensile strength, because the melting point of the raw material is a little lower than such temperature. When the hot raw material is out from the opening 45, it is cooled somewhat by the ambient air and, consequently, becomes slightly rigid but, nevertheless, easy to be formed. The roller 38 may be located where the flat thin film tape 47 is discharged downwardly by the effect of gravity. When the film tape touches the roller 38, it winds around the roller 38. The roller 38 is turned about its axis and is cooled by cooling water or some other selected liquid or gas coolant which may pass through the hole 56 in roller 38. The film tape is cooled by the roller 38 while the roller 38 is turning and shaped permanently into the configuration of the roller 38. In this connection, when the hot film tape touches the roller 38, it winds about the roller 38 tightly, because of its viscosity and low tensile strength. If it is desired, the film tape may be pressed to the roller 38 tightly with the help of silicone gum rollers 46 to assure the desired shaping of the film. After the film tape is shaped, it is separated from the roller 38 to the winding mechanism by the driving rollers 50 and 52.

Reference numeral 54 designates freely rotating widening rollers which possess different radii along their axis. The shaped film tape 48 is placed between the widening roller 54 and the driven roller 52. The rotation of the driving roller 52 widens and increases the width of the film tape 48. The opposed sides 58 of the film tape 48 straighten in a longitudinal direction to eliminate the looseness 60. The widening roller reduces or renders tight the looseness 60.

The shaped film tape 4 driven by driving rollers 50 and 52 is wound on the winding roller 68 for ease of carrying and handling. The winding roller 68 is approximately the same in configuration as the roller 38 but may be made of plastic or paper. The freely rotating roller 64 set on the arm 62 cooperates in shaping the middle part 66 of the film tape 48 arcuately and the edges of the film tape 48 go straightly as the tape emerges from the driving rolelr 52 and passes onto the winding roller 68. In this way, shaped film tape 70 is wound around the winding roller 68 substantially without creases or wrinkles. Thus, longer film tape can be wound with a relatively small radius.

It should be understood that the roller 38 is not limited specifically to the rollers illustrated in FIGS. 5 to 7 and that modifications may be introduced depending upon the purpose and the configuration of the product to be wrapped. The rip line 26 may be cut elsewhere than that shown in FIG. 2, for example, on the outermost surface of the mold 20. Except for this rip line, the design of the modified roller configuration can be accomplished in almost the same way as taught in FIGS. 6 and 7. This modified roller may be placed in the apparatus shown in FIGS. 8 and 9, and a shaped film tape is obtained which has the rip line on the outermost surface when wrapped around the annular product.

In the embodiments described above, the film tape width is the same as the circumferential length of the annular member. When the film tape width is larger than the circumferential length of the annular member, that is, the width of the roller is wider than that shown in FIGS. 5 to 7, the shaped film tape formed by the wider roller may cover the annular products partly.

In the embodiments described above, the axes of the rollers are set perpendicular to the longitudinal direction of the film tape and the relative position of the roller to the film tape is fixed. The relative position of the roller to the film tape may be changed during operation or the angle of the roller axis may not be perpendicular to the longitudinal direction of the film tape. In this manner, the rip line of the shaped film tape will be affected and can be made to go around the annular member when wrapping.

Figure 10:
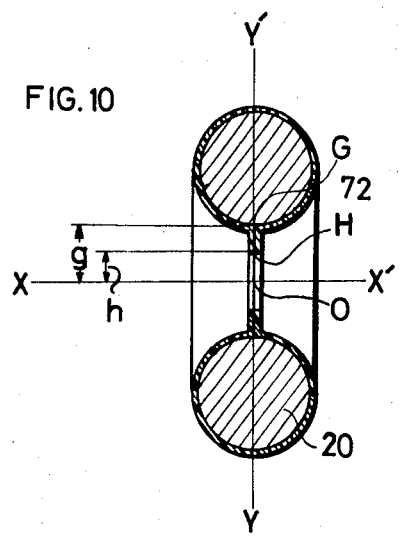
FIGS. 10 and 11 are schematic diagrams illustrating the method of determining the configuration of the roller of another embodiment.
Figure 11:
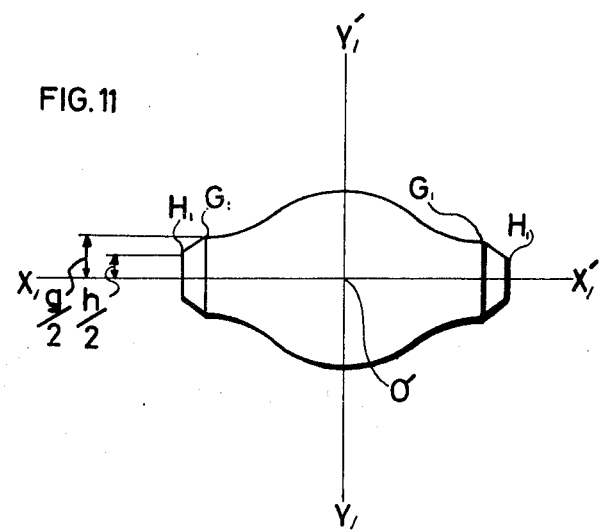

In FIG. 10, the cross-sectional view of the product 20 is essentially the same as FIG. 6 except for the flange part 72. For purposes of brevity, only the differences from FIG. 6 will be described. The flange part 72 is also represented by H, and the distance from the point H to the straight line X–X' are denoted as $h$. Circles having the length of segment GH are drawn which intersect with straight line passing through points in the line $Y'_1Y_1$ at distance $\frac{1}{2}h$ from the point O' on the side of Y' and running in parallel with the line X'X; and the outer intersecting points are designated by $H_1$. The curves joining the points shown in FIGS. 6, 7, 10 and 11 are turned about the straight line X'X to obtain the desired roller. The film tape shaped with this roller has a flanged part 72 when it wraps around the annular goods. This flanged part 72 is very convenient for sealing.

Figure 12:
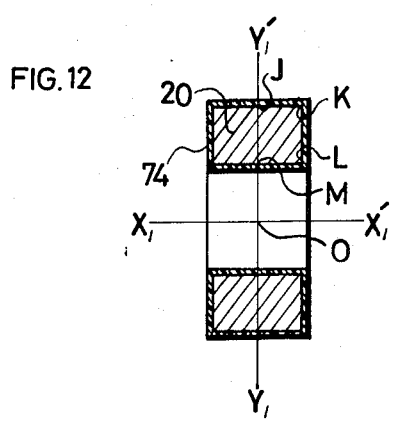
FIGS. 12 and 13 are schematic diagrams illustrating the method of determining the configuration of the roller of still another embodiment.
Figure 13:
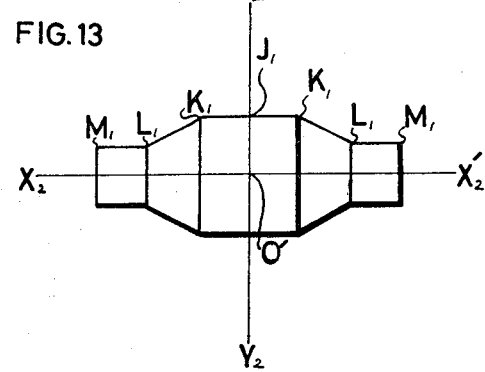

In the embodiments described above, the cross-section of the annular or ring-shaped product is circular; but it is not restricted to circular configuration. In FIG. 12, the cross-section of the annular product 20' is rectangular. The corner and the center on the product surface are indicated by J, K, L and M. As illustrated in FIGS. 6 and 7, parallel lines to $X_2X_2'$, the arc length JK, KL, L, M and the scaling factor makes the point $J_1$, $K_1$, $L_1$, $M_1$, as shown in FIG. 13. Then curves joining the points $M_1L_1K_1J_1K_1L_1M_1$ are turned about the straight line $X_2X'_2$ to obtain the roller.

In the above, when the raw material film tape is shaped by the roller, the middle of the width is stretched and the edges are not stretched. In this manner, the middle of the shaped film is thinner than the edges if the extruded raw material film tape is of uniform thickness. If this is not desired, the distance of the rips of the flat die 44 may be controlled. In this connection, the center of the opening 45 must be larger than the edges. Then the raw material film tape becomes thicker in its middle and thinner in the edges. When eventually shaped by the roller 38, the center is stretched and becomes thinner; and thus shaped film tape of uniform thickness may be obtained.

In contrast, if it is desired to obtain shaped film tape of transversely non-uniform thickness, non-uniform rips are used. This makes the shaped film tape thick in some part and thin in the remaining; and the thick part of the film may serve as reinforcement when it is wrapped around products.

Figure 14:
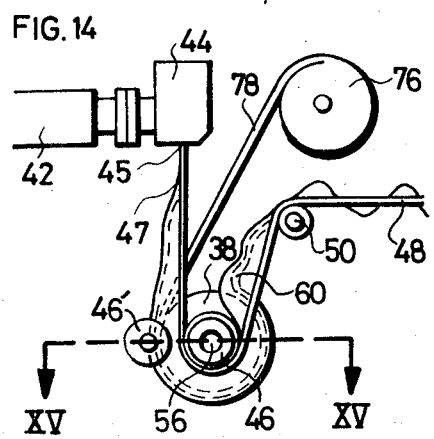
FIG. 14 is a side view illustrating the apparatus to make the film tape into the configuration of the roller and the laminating mechanism thereof.
Figure 15:
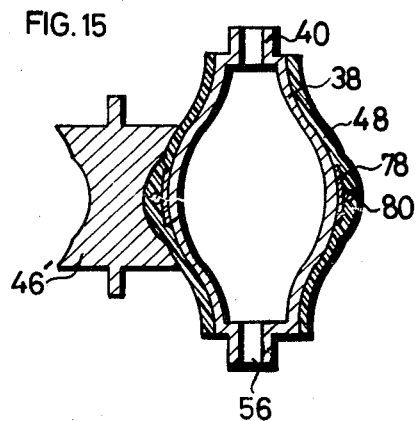
FIG. 15 is the cross-sectional view taken along the line XV—XV in FIG. 14.

In another preferred embodiment depicted in FIG. 14, apparatus is shown similar to that depicted in FIG. 8 with the addition of laminating mechanism. At the point where the raw material film 47 touches the roller 38, laminating tape 78 of desired width and selected material is introduced. Tape 78 is rolled out from the laminating tape roll 76. The laminating tape 78 will adhere to the film 47 because the film at this point is tacky. If it is desired, the film and the tape 78 may be pressed together with the help of silicone gum roller 46'. When the laminating tape 78 is made of strong material as, for example, woven cloth tape, it functions as reinforcement. When the laminating tape 78 is paper or woven tape with anti-corrosive material, the shaped film tape can not only wrap the annular goods air- or liquid-tight but also prevent the goods from rusting.

When the laminating tape is made of tape 78' and thread or wire 80, the unwrapping of annular product wrapped with this film tape becomes quite easy by simply pulling the thread or wire 80.

It will be apparent that many modifications and variations may be effected without departing from the scope of the novel concept of this invention.

Thus, the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A method of forming wrapping material for annular shaped articles comprising the steps of:
feeding a predetermined length of relatively thin, hot and deformable plastic film; providing a contoured roller for imparting the desired shape to the film; winding the film on the roller of predetermined and selected configuration to shape the film by conforming it to the shape of the roller; cooling the shaped film to permanently set its shape; and separating the permanently shaped film from the roller.

2. The method of forming wrapping material as claimed in claim 1 comprising the step of reinforcing the film incident to it being deformed to strengthen the shaped wrapping material.

3. The method of forming wrapping material as claimed in claim 2 including the steps of feeding a web of reinforcing tape between the film and the roller and then securing the tape to the film.

4. The method of forming wrapping material as claimed in claim 3 including the step of introducing a length of material along with tape to facilitate tearing of the wrapping material when removing it from the annular article.

5. The method of forming wrapping material as claimed in claim 1 including the step of applying pressure rollers to the film to facilitate shaping of the film about the roller.

6. The method of forming wrapping material as claimed in claim 1 including the step of passing a coolant through the roller to facilitate cooling of the film as it is being shaped.

7. The method of forming wrapping material as claimed in claim 1 including the steps of pulling the shaped plastic film transversely after it is separated from the roller and thereafter rolling up the transversely pulled, shaped plastic film.

References Cited

UNITED STATES PATENTS

| | | | |
|---|---|---|---|
| 3,031,357 | 4/1962 | Balkin et al. | 156—189 |
| 1,274,910 | 8/1918 | Lister | 156—193 X |
| 1,527,720 | 2/1925 | Wildman | 156—193 X |
| 2,859,061 | 11/1958 | Reid | 156—213 X |
| 3,296,056 | 1/1967 | Bechtold | 156—212 X |

STEPHEN J. LECHERT, JR., Primary Examiner

U.S. Cl. X.R.

156—190, 193, 162, 164, 212, 244, 248, 249, 250, 306, 311, 322